United States Patent
Gwidt et al.

(10) Patent No.: US 12,384,218 B1
(45) Date of Patent: Aug. 12, 2025

(54) SMART VEHICLE SYSTEMS AND CONTROL LOGIC WITH TIRE CHANGE MODES FOR VEHICLES WITH ADJUSTABLE RIDE HEIGHT SUSPENSIONS

(71) Applicant: GM GLOBAL TECHNOLOGY OPERATIONS LLC, Detroit, MI (US)

(72) Inventors: J. Michael Gwidt, Brighton, MI (US); Karen Margaret-Bell Gwidt, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 18/437,271

(22) Filed: Feb. 9, 2024

(51) Int. Cl.
*B60G 17/017* (2006.01)
*B60G 17/019* (2006.01)
*G09B 19/00* (2006.01)

(52) U.S. Cl.
CPC ..... *B60G 17/01908* (2013.01); *B60G 17/017* (2013.01); *G09B 19/003* (2013.01); *B60G 2400/0511* (2013.01); *B60G 2400/0512* (2013.01); *B60G 2401/00* (2013.01); *B60G 2500/32* (2013.01)

(58) Field of Classification Search
CPC .................................................. B60G 17/017
See application file for complete search history.

(56) References Cited

U.S. PATENT DOCUMENTS

| | | | |
|---|---|---|---|
| 5,593,176 A | 1/1997 | Campbell et al. | |
| 7,267,331 B2 | 9/2007 | Holbrook | |
| 7,506,540 B1 | 3/2009 | Job | |
| 9,162,548 B1 | 10/2015 | Wakeman | |
| 9,713,947 B2 | 7/2017 | Irwin et al. | |
| 9,994,070 B2 | 6/2018 | Saje et al. | |
| 11,780,263 B2 | 10/2023 | Rodgers et al. | |
| 12,070,971 B1 * | 8/2024 | Mizrachi | B60C 11/246 |
| 2008/0086248 A1 * | 4/2008 | Lu | B60W 40/101 |
| | | | 701/41 |
| 2010/0320704 A1 | 12/2010 | Kolp et al. | |
| 2011/0098882 A1 * | 4/2011 | Sugisawa | G01L 17/00 |
| | | | 701/33.4 |
| 2014/0367930 A1 | 12/2014 | Zeweke et al. | |
| 2018/0154726 A1 * | 6/2018 | Fida | B60G 17/017 |

(Continued)

FOREIGN PATENT DOCUMENTS

DE 102014213845 A1 4/2015

*Primary Examiner* — Long T Tran
(74) *Attorney, Agent, or Firm* — Quinn IP Law (57) ABSTRACT

Presented are advanced control systems providing tire change modes for vehicles with adjustable ride-height suspension systems, methods for making/using such systems, and vehicles equipped with such systems. A method of operating a vehicle includes a controller receiving an input signal indicative of a tire change event for the vehicle, and determining a location of a tire associated with the tire change event. In response to receiving the input signal, the controller determines if a real-time slope of the vehicle is greater than a preset maximum secure slope; if not, the controller prompts a user to prepare the vehicle for the tire change event. After prompting the user to prep the vehicle, the controller commands the vehicle's ride height suspension system to lower the ride height of the tire's corner module to a predefined lowered height and raise the ride height of all other corner module to a predefined raised height.

20 Claims, 3 Drawing Sheets

(56) References Cited

U.S. PATENT DOCUMENTS

| | | | |
|---|---|---|---|
| 2022/0016949 A1* | 1/2022 | Graus | B60G 17/08 |
| 2023/0063561 A1* | 3/2023 | Nobileau | B60M 1/34 |
| 2023/0092680 A1* | 3/2023 | Heitzmann | B60G 17/0155 |
| | | | 280/6.153 |
| 2023/0406306 A1* | 12/2023 | Oh | B60W 10/08 |
| 2025/0026337 A1* | 1/2025 | Mizrachi | B60W 10/18 |

* cited by examiner

SMART VEHICLE SYSTEMS AND CONTROL LOGIC WITH TIRE CHANGE MODES FOR VEHICLES WITH ADJUSTABLE RIDE HEIGHT SUSPENSIONS

INTRODUCTION

The present disclosure relates generally to suspension systems and wheel assemblies of motor vehicles. More specifically, aspects of this disclosure relate to systems and methods for changing tires of vehicles with adjustable ride height suspension systems.

Current production motor vehicles, such as the modern-day automobile, are originally equipped with a powertrain that operates to propel the vehicle and power the vehicle's onboard electronics. In automotive applications, the powertrain is generally typified by a prime mover—an engine and/or an electric motor—that delivers driving torque through a power transmission to the vehicle's final drive system (e.g., differential, axle shafts, corner modules, road wheels, etc.). For many automotive drivelines, a road wheel assembly is a pneumatic unit with a synthetic-rubber tire that is fitted onto the outer rim ("barrel") of a metallic wheel. To ensure consistent road handling, steering, and braking, each wheel assembly is connected to the vehicle chassis through a respective corner module of a vehicle suspension system. For instance, a corner module of a rear-wheel drive automobile may employ a steering knuckle with a spindle onto which a hub and a brake rotor are rotatably mounted. Inboard contact points of the knuckle are coupled to the vehicle body, e.g., via a control arm, sway bar, strut damper, and tie rod, whereas the outboard end is coupled to a wheel face of the wheel hub, e.g., via the spindle and hub.

Advanced vehicle suspension systems may now employ controller automated components, such as variable-stiffness shock absorbers and variable-rate strut springs, that permit a number of damping factors to be selectively modified for improved vehicle operation. Pneumatically controlled suspension springs, for example, may be inflated to jointly increase the overall spring rate of the vehicle's suspension system and, conversely, may be deflated to decrease the spring rate. In addition to varying spring rate, vehicle suspensions including controllable strut assemblies may be electronically controlled to select a height of the vehicle undercarriage relative to the wheels' contact patches and roadway surface, which is more commonly referred to as the "ride height". Vehicle ride height may be lowered, for example, to reduce drag and increase handling at highway speeds, and may be raised to increase clearance and enhance ride comfort at lower speeds.

SUMMARY

Presented below are intelligent vehicle systems with control logic that provision advanced tire change modes for motor vehicles with adjustable ride height suspension systems, methods for manufacturing and methods for operating such systems, and motor vehicles equipped with such systems. By way of illustration, and not limitation, a closed-loop vehicle control algorithm for an independently adjustable ride height suspension system activates a tire change mode that automates tire-dependent ride height adjustments to facilitate the changing of a tire. Activation of the tire change mode may be automated by a resident tire-pressure monitoring system (TPMS), e.g., upon detection of an under-pressurized tire, or manually activated by a vehicle occupant, e.g., via a centerstack telematics unit. Once activated, the tire change mode will evaluate a real-time vehicle slope, e.g., using a resident inertial measurement unit (IMU), and alert the user if the slope is too steep to securely change the tire. Upon confirming that the vehicle is secure, the tire change mode will prompt the user to pre-prep the tire change, e.g., park and key-off the vehicle, place a jack stand near the flat tire, loosen the wheel nuts, etc. Tire change mode will then lower the ride height at the tire change location to a lowest or near lowest ride height, and concurrently raise the ride height at all other tire locations to a highest or near highest ride height. This tire change mode may help to ensure the vehicle is on a secure gradient while eliminating the need for a hand-cranked or hydraulic jack to change the tire.

Aspects of this disclosure are directed to intelligent vehicle control systems, memory-stored control protocols, and system control logic for provisioning advanced tire change modes for motor vehicles with adjustable ride height suspension systems. In an example, a method is presented for operating a motor vehicle that has a vehicle body, multiple wheel assemblies, and an adjustable ride height suspension system with multiple corner modules each movably attaching a respective wheel assembly to the vehicle body. This representative method includes, in any order and in any combination with any of the above and below disclosed options and features: receiving, e.g., via a resident or remote microcontroller, control module, logic device, or network of controllers/modules/devices (collectively "controller"), an input signal indicative of a tire change event for the motor vehicle (e.g., flat, worn, or damaged tire needing repair or replacement); determining, e.g., via the controller based on user or TPMS feedback, the location of the tire associated with the tire change event (e.g., a tire change location of a first tire of a first wheel assembly); determining, e.g., via the controller using dynamic vehicle sensor data in response to receiving the tire change input signal, if a real-time slope of the motor vehicle is less than or equal to a preset maximum secure slope (e.g., 8° angle); prompting, e.g., via the controller using a centerstack telematics unit in response to determining the real-time vehicle slope is less than or equal to the preset maximum secure slope, a user to pre-prep the vehicle for the tire change event; and commanding, e.g., via the vehicle controller after prompting the user to prep the vehicle, the adjustable ride height suspension system to: (1) lower the ride height of the corner module of the tire being changed to a calibrated lowered height; and (2) raise the ride heights of the other corner module(s) of the tire(s) not being changed to a calibrated raised height.

Aspects of this disclosure are also directed to computer-readable media (CRM) containing controller-executable instructions for executing a tire change mode for vehicles with independently adjustable ride height suspensions. In an example, a non-transient CRM stores instructions that are executable by one or more processors of a vehicle controller of a motor vehicle. The motor vehicle includes a vehicle body, multiple (first, second, . . . ) wheel assemblies, and an adjustable ride height suspension system with multiple (first, second, . . . ) corner modules each movably attaching a respective one of the wheel assemblies to the vehicle body. The CRM-stored instructions, when executed by the processor(s), cause the vehicle controller to perform operations, including: receiving an input signal indicative of a tire change event for the motor vehicle; determining a tire change location of a first tire of a first wheel assembly associated with the tire change event; in response to receiving the input signal, determining if a real-time vehicle slope of the motor vehicle is less than or equal to a preset maximum secure slope; in response to the real-time vehicle slope being less than or equal to the preset maximum secure slope, prompting a user to prepare the motor vehicle for the tire change event; and, after prompting the user to prepare the motor vehicle, commanding the adjustable ride height suspension system to lower a first ride height of a first corner module bearing the first wheel assembly to a predefined lowered height and raise a second ride height of a second corner module to a predefined raised height higher than the predefined lowered height.

Additional aspects of this disclosure are directed to motor vehicles equipped with intelligent control systems that provision advanced tire change modes using the vehicle's adjustable ride height suspension system. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, off-road and all-terrain vehicles (ATV), motorcycles, farm equipment, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. A prime mover, such as an electric traction motor and/or an internal combustion engine assembly, drives one or more of the road wheels to thereby propel the vehicle. The vehicle is also equipped with an adjustable ride height suspension system with controller-automated corner modules that movably mount the vehicle's road wheel assemblies to the vehicle body.

Continuing with the discussion of the foregoing example, the motor vehicle also includes a vehicle controller that is programmed to receive, e.g., from a vehicle occupant or the vehicle's resident TPMS, an input signal indicating a tire change event is needed for the motor vehicle. The vehicle controller then determines a location of the tire associated with the tire change event (e.g., a first tire of a first wheel assembly mounted at a tire change location). In response to receiving the tire change input signal, the controller then determines a real-time vehicle slope of the motor vehicle and, in tandem, determines if the vehicle slope is less than or equal to a preset maximum secure slope; if so, the controller responsively prompts a driver, passenger, owner, repair technician, etc. (collectively "user") of the vehicle to prep the vehicle for the tire change event. Once the vehicle is prepped, the controller commands the vehicle's adjustable ride height suspension system to lower the ride height of the corner module of the tire being changed to a predefined lowered height and raise the ride height(s) of the other corner module(s) to a predefined raised height that is markedly higher than the predefined lowered height.

For any of the disclosed vehicles, methods, and CRM, the predefined lowered height may be a lowest or near lowest ride height position available for the vehicle's corner modules. Conversely, the predefined raised height may be a highest or near highest ride height position available for the vehicle's corner modules. The predefined lowered and raised heights may be calibrated to the subject vehicle's make, model, trim, etc. As a further option, each corner module assembly may include a respective controller-adjustable strut assembly; lowering the ride height of a corner module may include actively contracting the uncompressed length of its strut assembly, whereas raising the ride height of a corner module may include expanding the uncompressed length of its strut assembly.

For any of the disclosed vehicles, methods, and CRM, the vehicle controller may actively determine the subject vehicle's real-time slope prior to determining if the vehicle slope exceeds the preset maximum secure slope. In this instance, the vehicle controller may communicate with a resident multi-axis inertial measurement unit (IMU) to receive therefrom sensor data that is indicative of a real-time (transverse-axis) pitch angle and/or a real-time (longitudinal-axis) roll angle of the motor vehicle. Upon determining that the real-time vehicle slope is not less than or equal to the preset maximum secure slope, the vehicle controller may responsively prompt the user to reposition the motor vehicle. In this example, the controller may automatically start a loop exit timer when prompting the user to reposition the motor vehicle and may concomitantly determine if the user repositions the vehicle prior to expiration of the loop exit timer. If not, the controller may automatically exit the tire change mode. If the user repositions the vehicle before expiration of the loop exit time, the vehicle controller may automatically determine if the subject vehicle's new real-time slope at the new position is less than or equal to the preset maximum secure slope. As a further option, the vehicle user may selectively activate/deactivate the tire change mode to thereby enter/exit the tire change mode.

For any of the disclosed vehicles, methods, and CRM, prompting the user to prep the vehicle for the tire change event may include-singly or in any combination-instructing the user to: (1) shift the subject vehicle's powertrain into a park mode; (2) key-off the vehicle's motor/engine; (3) activate hazard lights, set parking brake, and/or place warning flares/triangles; (4) place a jack stand adjacent the location of the tire being changed; (5) loosen the mounting lug nuts of the wheel assembly of the tire being changed; and (6) align the jack stand underneath the corresponding jack point on vehicle chassis. As a further option, the vehicle controller may be programmed to thereafter determine if the tire change event is complete (e.g., the user repaired or replaced the damaged/worn/flat tire); if so, the controller may responsively command the vehicle's adjustable ride height suspension system to raise the ride height of the corner module of the changed tire to a preselected (default or user-designated) height and concurrently lower the ride height(s) of the other corner module(s) to a preselected (default or user-designated) height.

For any of the disclosed vehicles, methods, and CRM, the input signal indicative of the tire change event may include an activation input received by the vehicle controller from the user via a human machine interface (HMI) device (e.g., the user pressing a START TIRE CHANGE MODE softkey on a touchscreen display of a resident telematics unit or a handheld portable computing device). In this instance, the particular location of the tire being changed may be a tire selection input received by the controller from the user via the HMI (e.g., the user selecting the tire's location on the touchscreen display). Rather than require manual inputs from the user, the vehicle controller may automate activation and, if desired, one or more select operations of the tire change mode. Upon receipt of a low tire pressure signal (e.g., tire pressure less than 20 pounds per square inch (PSI)) from a tire-pressure monitoring system (TPMS), for example, the vehicle controller may automatically activate the tire change mode or, alternatively, may alert the user of the low tire pressure and prompt user activation of the tire change mode. Moreover, the vehicle controller may automatically identify the location of the tire being changed using, for example, respective tire identification data contained in the low tire pressure signal received from the TPMS.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" are to be construed as meaning "one or more" unless expressly disclaimed); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Figure 1:
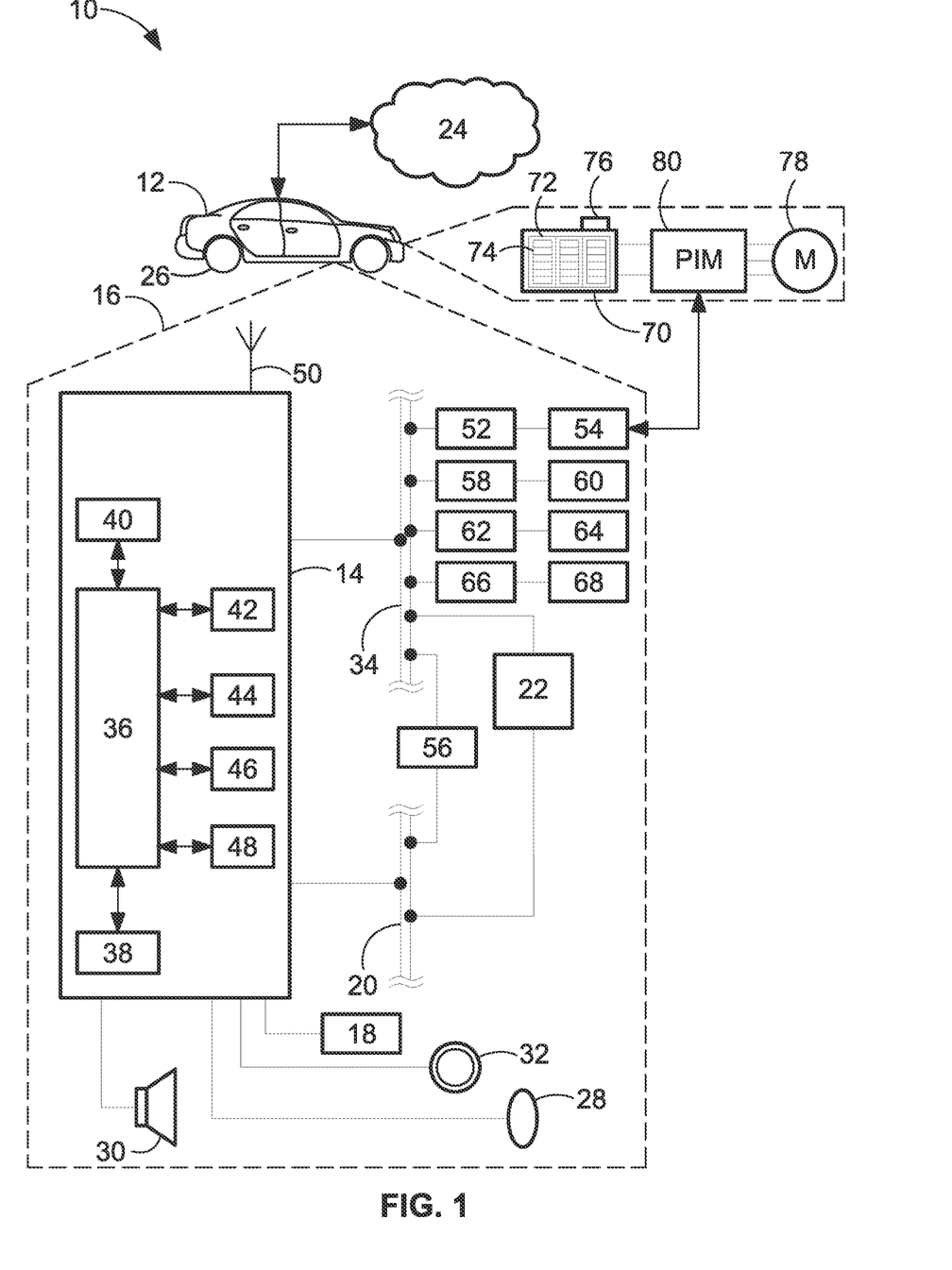
FIG. 1 is a partially schematic, side-view illustration of a representative motor vehicle with a network of on-vehicle controllers, sensing devices, and communication devices that provision an advanced tire change mode using the vehicle's adjustable ride height suspension system in accordance with aspects of the present disclosure.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts using the independently adjustable ride height suspension system illustrated in FIG. 2 should be appreciated as a non-limiting implementation of disclosed features. As such, it will be understood that aspects and features of this disclosure may be carried out by other ride-height suspension systems and may be incorporated into any logically relevant type of vehicle. Moreover, only select components of the motor vehicle and vehicle suspension system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a centerstack telecommunications and information ("telematics") unit 14 that wirelessly communicates, e.g., via cell towers, satellite service, etc., with a remotely located cloud computing host service 24 (e.g., ONSTAR®). Other in-vehicle hardware components 16 shown in FIG. 1 include, as non-limiting examples, an electronic video display device 18, a microphone 28, audio speakers 30, and assorted user input controls 32 (e.g., buttons, knobs, switches, touchscreens, etc.). These hardware components 16 function as a human/machine interface (HMI) that enables a user to communicate with the telematics unit 14 and other components both resident to and remote from the vehicle 10. Microphone 28, for instance, provides occupants with means to input verbal commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. Network connection interface 34 enables vehicle hardware 16 to send and receive signals with one another and with systems and subsystems both onboard and off-board the vehicle body 12. This allows the vehicle 10 to perform assorted vehicle functions, such as modulating powertrain output, activating a vehicle brake system, controlling vehicle steering, regulating charge and discharge of vehicle batteries, and other automated functions. For instance, the in-vehicle telematics unit 14 of FIG. 1 may receive and transmit signals to/from a Powertrain Control Module (PCM) 52, a Suspension System Control Module (SSCM) 54, a Tire-Pressure Monitoring System (TPMS) module 56, a Steering Control Module (SCM) 58, a Brake System Control Module (BSCM) 60, and assorted other vehicle ECUs.

With continuing reference to FIG. 1, telematics unit 14 is an onboard computing device that provides a mixture of services, both individually and through its communication with other networked devices. The telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to an integrated circuit (IC) real-time clock (RTC) 42 and one or more electronic memory devices 38, each of which may take on the form of a CD-ROM, solid-state drive (SSD) memory, hard-disk drive (HDD) memory, semiconductor memory, etc.

Long-range communication (LRC) capabilities with off-board devices may be provided via a cellular communication chipset, a navigation and location component (e.g., global positioning system (GPS) transceiver), and/or a wireless modem, all of which are collectively represented at 44. Short-range communication (SRC) may be provided via a close-range wireless communication device 46 (e.g., a BLUETOOTH® unit), a dedicated short-range communications (DSRC) component 48, and/or a dual antenna 50. The above-described communications devices may provision data exchanges as part of a periodic broadcast in a vehicle-to-vehicle (V2V) communications system or a vehicle-to-everything (V2X) communications system. It should be understood that the vehicle 10 may be implemented without one or more of the above-listed components or, optionally, may include additional components and functionality as desired for a particular end use.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of on-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is represented in FIG. 1 by an electric traction motor 78 that is connected to a rechargeable energy storage system (RESS), which may be in the nature of a chassis-mounted traction battery pack 70. The battery pack 70 may contain one or more battery modules 72 each housing a group of electrochemical battery cells 74, such as lithium-ion or lithium-polymer battery cells of the pouch, can, or prismatic type. One or more electric machines, such as a variable-speed, multiphase motor/generator (M) unit 78, draw electrical power from and, optionally, deliver electrical power to one or more rechargeable battery units, such as traction battery pack 70. A high-voltage (HV) electrical system with a power inverter module (PIM) 80 electrically connects the battery pack 70 to the motor/generator unit(s) 78 and modulates the transfer of electrical current therebetween. The battery pack 70 may be configured such that module management, cell sensing, and module-to-host communications functionality is integrated directly into each module 72 and performed wirelessly via a wireless-enabled cell monitoring unit (CMU) 76.

Figure 2:
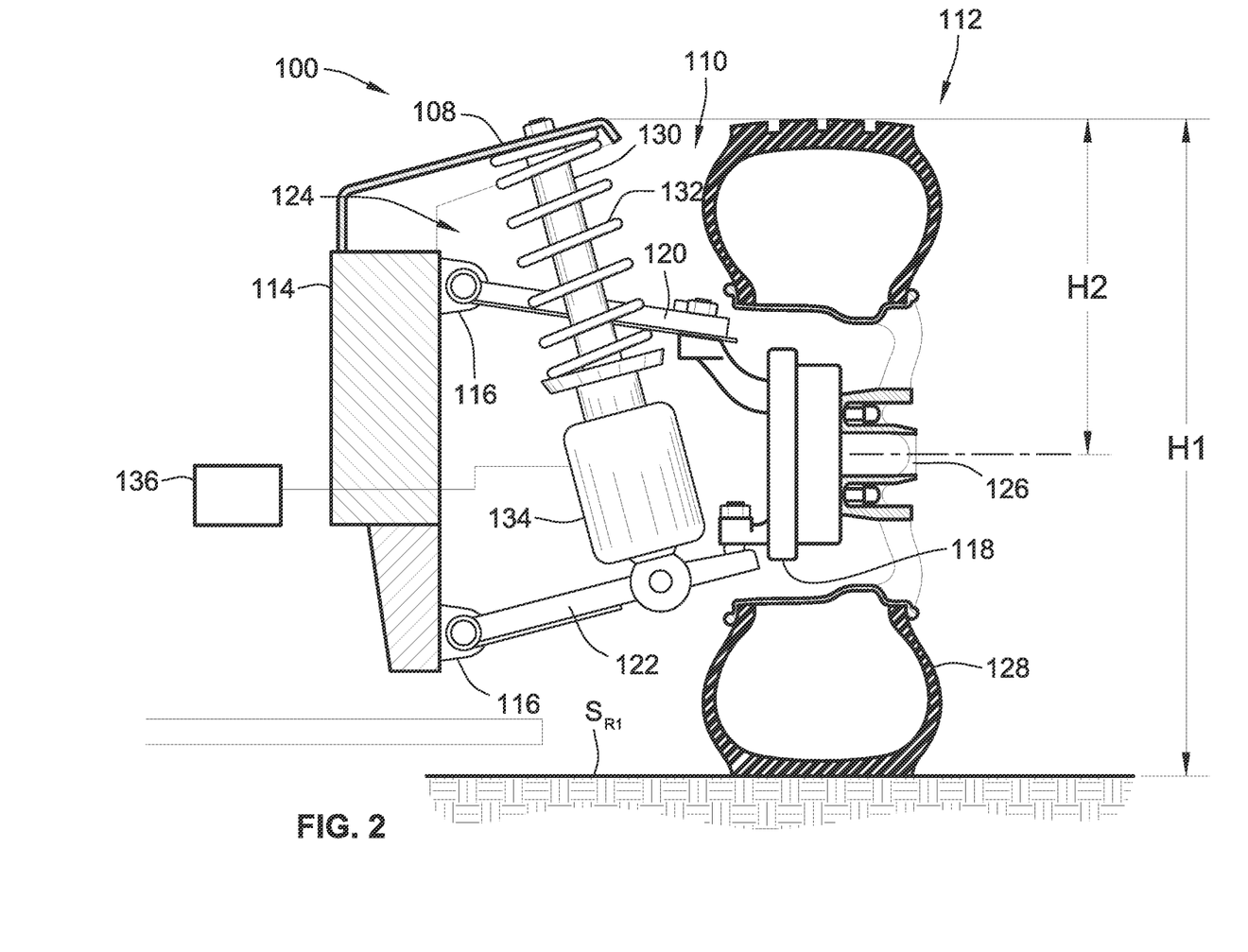
FIG. 2 is a partially schematic, section-view illustration of a representative vehicle corner module and wheel assembly with an independently adjustable ride height suspension system in accord with aspects of the disclosed concepts.

To help optimize vehicle ride quality with balanced road handling, a multilink vehicle suspension system 100 provides controlled relative motion—"jounce" and "rebound"—between the road wheels and load-bearing chassis during vehicle operation. For steerable wheel units, such as front driver-side and passenger-side road wheels, the suspension system may also help to regulate tire camber and caster in order to maintain proper wheel alignment. Turning next to FIG. 2, there is shown a non-limiting example of a vehicle corner module 110 that movably mounts a wheel assembly 112 to complementary mount brackets 116 on a chassis side beam 114 of a motor vehicle (e.g., automobile 10 of FIG. 1) as part of an independently adjustable ride height suspension system. The corner module 110 may be adapted as a frontend wheel corner for front driver-side and passenger-side road wheels of a front-wheel drive (FWD) vehicle and, optionally, as a rearend wheel corner for rear driver-side and passenger-side road wheels of an all-wheel drive (AWD) vehicle. In accord with the depicted example, each corner module 110 may be typified by: a steering knuckle 118, a pair of leading and trailing upper control arms (UCA) 120; a pair of leading and trailing lower control arms (LCA) 122, and a ride-height adjustable strut assembly 124. It will be appreciated that the corner module 110 may include greater, fewer, or alternative components from that which are shown in the drawings, such as a tie bar link (TBL), a stabilizer link (SL) bar, alternative strut assembly designs, etc.

Vehicle handling, ride, and efficiency may be dramatically affected by a height of the vehicle's undercarriage relative to the roadway surface and contact patches of the vehicle wheels; this height is more commonly referred to as a vehicle's "ride height". By way of non-limiting example, FIG. 2 portrays a representative vehicle ride height H1 as a vertical distance between an upper mount head 108 of the vehicle body 12 and a contact point between a road surface SRI and a wheel assembly tire 128. As another option, vehicle ride height may be defined as a vertical distance between a designated (first) reference point on the vehicle body 12 and a designated (second) reference point on the wheel assembly 112. In FIG. 2, for example, a vehicle ride height H2 may be characterized as a vertical distance between an outboard lip of the upper mount head 108 relative to a rotational axis of a designated wheel assembly 112. For practical purposes, a radial center of the wheel face of a respective wheel hub 126 of wheel assembly 112 may be designated as the subject reference point. Using a manufacturer's defined tire diameter, the height H2 can then be used to estimate, e.g., within a range of permissible error, the height H1 of the vehicle body 12 relative to the road surface SRI.

The four corner modules 110 cooperatively represent the hydromechanical hardware of an independently adjustable ride height suspension system that may enable both driver-designated and system-automated ride height selection at each corner of the vehicle. In accord with the illustrated example, the ride-height adjustable strut assembly 124 is generally comprised of a spring-damping shock absorber 130, a force-absorbing helical spring 132, and a variable-height fluid bladder 134. The shock absorber 130 and strut spring 132 are passively actuated components that cooperatively absorb and dampen forces generated at the wheel assembly 112 as the vehicle traverses the road surface SRI. The bladder 134 is an actively actuated and expandable fluid-tight container that is filled with compressed air or hydraulic fluid from a fluid tank/compressor 136 to selectively expand in volume and thereby increase the uncompressed length of the strut assembly 124. In so doing, the ride height of the vehicle at the corner module assembly 110 is actively raised. To decrease the uncompressed length of the strut assembly 124 and thereby actively lower the vehicle ride height at the corner module assembly 110, compressed air/hydraulic fluid is evacuated from the bladder 134 back to the fluid tank/compressor 136 by a suitable system controller or control module, such as SSCM 54 of FIG. 1.

Figure 3:
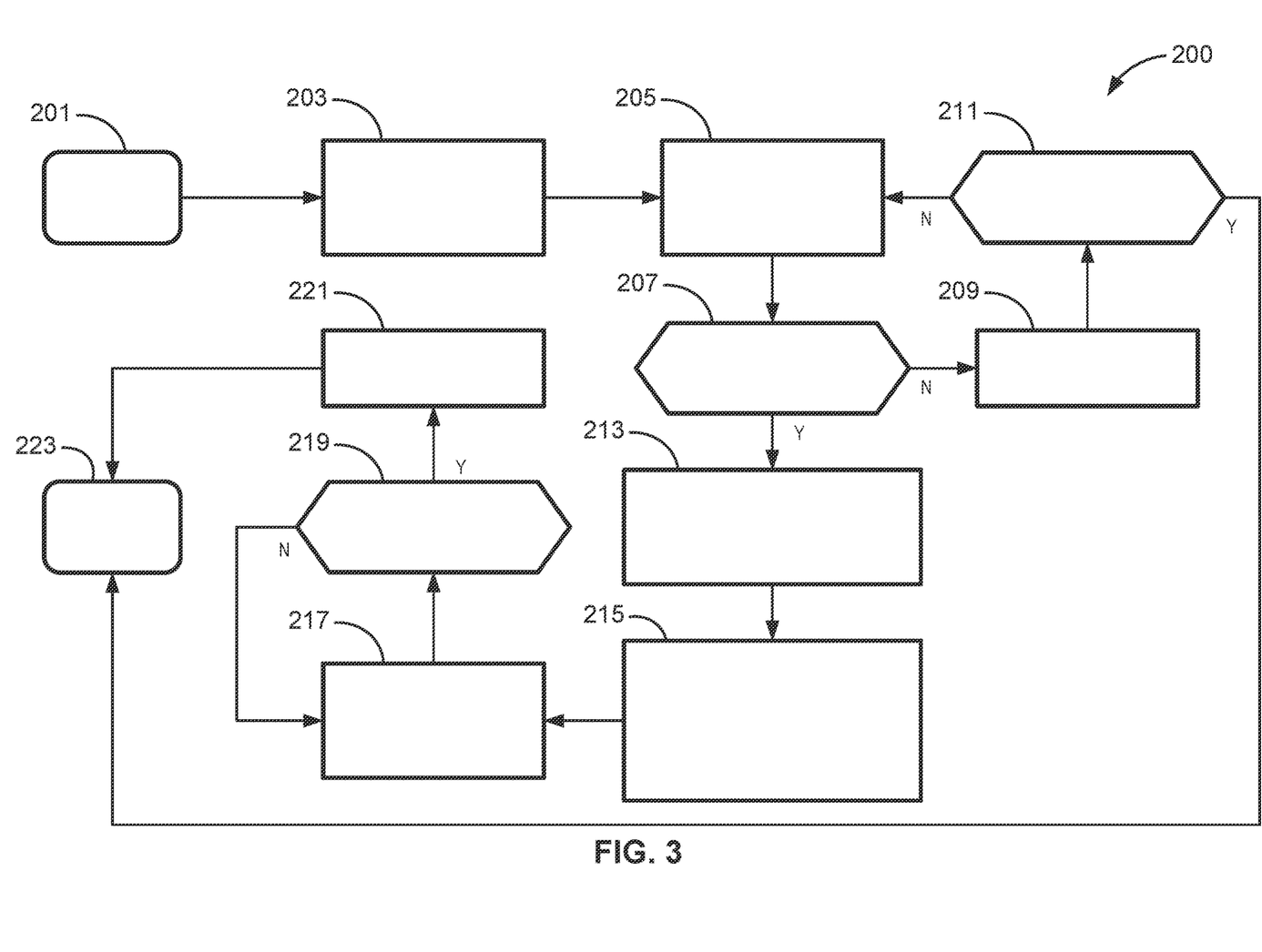
FIG. 3 is a flowchart illustrating a representative vehicle control protocol provisioning a tire change mode for a motor vehicle with an adjustable ride height suspension system, which may correspond to memory-stored instructions that are executable by a resident or remote microcontroller, control-logic circuit, system control module, or other integrated circuit (IC) device or network of circuits/modules/microcontrollers/IC devices (collectively "controller") in accord with aspects of the disclosed concepts.

With reference next to the flow chart of FIG. 3, an improved method or control strategy for provisioning an advanced tire change mode for a motor vehicle, such as automobile 10 of FIG. 1, with an independently adjustable ride height suspension system, such as suspension system 100 of FIG. 2, is generally described at 200 in accordance with aspects of the present disclosure. Some or all of the operations illustrated in FIG. 3 and described in further detail below may be representative of an algorithm that corresponds to non-transitory, processor-executable instructions that are stored, for example, in main or auxiliary or remote memory (e.g., resident memory device 38 and/or remote cloud computing service 24 database of FIG. 1), and executed, for example, by an electronic controller, processing unit, dedicated control module, logic circuit, or other module or device or network of controllers/modules/devices (e.g., CPU 36 and/or processor 40 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 3 with memory-stored, processor-executable instructions for initializing a tire change mode procedure for a subject vehicle experiencing a tire change event (e.g., vehicle tire being repaired or replaced). This routine may be available for initialization in real-time, near real-time, continuously, systematically, and/or at predefined time intervals during operation of the motor vehicle 10. As yet another option, terminal block 201 may initialize responsive to a user command prompt (e.g., via telematics input controls 32), a resident vehicle controller prompt (e.g., from CPU 36), or a broadcast prompt signal received from a centralized back-office (BO) vehicle services system (e.g., from cloud host service 24). By way of non-limiting example, method 200 may automatically initialize by presenting a vehicle occupant with a telematics touchscreen-selectable option to activate the tire change mode, e.g., upon receipt by CPU 36 of a low tire pressure signal from TPMS module 56. Upon completion of some or all of the control operations presented in FIG. 2, method 200 may advance to END terminal block 223 and temporarily terminate or, optionally, may loop back to terminal block 201 and run in a continuous loop.

Advancing from terminal block 201 to TIRE CHANGE MODE input block 203, method 200 activates an advanced tire change mode and determines a location of the tire being changed. For a manually activated implementation, an activation input may be received by a vehicle controller from a user via a human machine interface (HMI) device. In the example of FIG. 1, a driver of vehicle 10 may press a START TIRE CHANGE MODE softkey on the touchscreen 32 display device 18 of the resident telematics unit 14 to activate the tire change mode. Once activated, the user may be prompted to manually enter a tire change location or select from a set of touchscreen softkey options to choose a tire location of the tire being changed. Rather than use the input controls 32 of telematics unit 14, the user may input selections and responses using a handheld personal computing device, such as a smartphone, laptop or tablet computer, that is communicatively connected to the vehicle 10.

For a vehicle automated implementation, the vehicle controller may automatically activate the tire change mode and, if desired, automate other select operations of the tire change mode. Upon receipt of a low tire pressure signal from the TPMS module 56, for example, the CPU 36 of FIG. 1 may activate the tire change mode and locate the tire being changed using tire identification data contained in the low tire pressure signal received from the TPMS module 56. In a more specific yet non-limiting example, the TPMS module 56 continually communicates with tire pressure sensors for all four drive wheels 26; upon receipt of sensor data from a tire pressure sensor indicating a real-time tire pressure that is less than or equal to 20 PSI ("flat tire pressure"), the CPU 36 activates the tire change mode and identifies the tire associated with that sensor (e.g., front passenger-side tire pressure sensor showing flat tire). The baseline tire pressure may be a universal value (e.g., ≤20 PSI), may be calibrated to a specific vehicle make/model/trim (e.g., ≤25 PSI for large SUV), or may be a preset pressure differential (e.g., >10 PSI) between flat tire pressure and other tire pressures. It may be desirable, for at least some implementations, that the CPU 36 alert the user of a detected low tire pressure and provide the user with an option to override the tire change mode.

After activating the tire change mode at input block 203, method 200 responsively executes VEHICLE SLOPE data input block 205 to ascertain the slope of the subject vehicle so as to ensure that the vehicle is on a generally flat or otherwise secure surface. The vehicle CPU 36 of FIG. 1, for example, may communicate over network connection interface 34 with the vehicle dynamics sensors 68 package to retrieve real-time vehicle pitch angle data and, optionally, real-time roll angle data from a resident inertial measurement unit (IMU). Upon activation of the tire change mode, it may be desirable that the vehicle controller instruct the vehicle driver to park the vehicle on a sufficiently level surface using, for example, the display device 18 and/or the audio speaker(s) 30.

Once the real-time vehicle slope data is retrieved, the method 200 advances to SECURE SLOPE decision block 207 to determine whether or not the real-time vehicle slope of the motor vehicle is less than or equal to a preset maximum secure slope. The maximum secure slope value may be a universal value (e.g., ≤about 8° angle), may be a manufacturer-defined range (e.g., between about 0 and 10%), or may be calibrated to the subject vehicle's make/model/trim/etc. (e.g., dependent on wheel base, gross vehicle weight (GVW), vehicle width, tire size, etc.). Some application designs may evaluate both a real-time fore-aft pitch angle (e.g., ≤about 8°) and a real-time lateral roll angle (e.g., ≤about 5°) of the subject vehicle to help ensure a secure vehicle location. The maximum secure slope, like the baseline tire pressure and other system operating parameters, may be stored in and retrieved from resident cache memory, vehicle main memory, or BO cloud service database memory.

In response to a determination that the real-time vehicle slope is not less than or equal to the preset maximum secure slope (Block 207=NO), method 200 advances to VEHICLE RELOCATION output block 209 and prompts the user to reposition the motor vehicle. If the vehicle 10 of FIG. 1 is not situated on a generally flat or otherwise secure surface to complete the tire change event, for example, telematics unit 14 may output visual, audible, and/or haptic cues to the driver to move the vehicle 10. At the same time, the CPU 36 may actively monitor the vehicle's real-time position (GPS) and slope (IMU) and alert the user when the subject vehicle 10 is on a secure surface. Alternatively, the CPU 36 may wait for and respond to a manually entered user input denoting that the vehicle has been moved to a new location in order to reevaluate the vehicle's real-time slope.

Concurrent with output block 209, the vehicle controller may automatically start a loop exit timer, e.g., using real-time clock 42, to monitor the time it takes for the user to reposition the subject vehicle. At optional LOOP TIMER decision block 211, method 200 concomitantly determines if the loop exit timer expired before the user has properly repositioned the vehicle. If so (Block 211=YES), the method 200 may automatically exit the tire change mode and temporarily terminate at terminal block 223. Responsive to a determination that the user has properly repositioned the vehicle prior to expiration of the loop exit timer (Block 211=NO), method 200 returns to blocks 205 and 207 to determine if a new real-time slope of the subject vehicle is less than or equal to the preset maximum secure slope. Method 200 may run in a continuous loop through blocks 205, 207, 209 and 211 until an acceptable vehicle slope is achieved, until the loop exit timer has expired, or until a loop exit counter reaches a threshold number of failed attempts.

Once the smart vehicle system is able to verify that the real-time vehicle slope does not exceed the maximum secure slope (Block 207=YES), method 200 advances to VEHICLE PREP output block 213 and prompts the user to prepare the subject vehicle for completing the tire change event. Prompting the user to prepare the vehicle for the tire change event may include visual and/or audible instructions for the user to: (1) shift the subject vehicle's powertrain into park mode; (2) key-off the vehicle's motor/engine (e.g., with accessory mode left active); (3) activate the vehicle's hazard lights, set the vehicle's parking brake, and/or place warning flares/triangles; (4) place a jack stand adjacent the location of the tire being changed; (5) loosen the mounting lug nuts of the wheel assembly of the tire being changed; and/or (6) align the jack stand underneath the corresponding jack point on the vehicle chassis. At this juncture, the method 200 may optionally provide the user with step-by-step instructions for changing the subject tire. As yet a further option, the vehicle controller may automate one or more of the foregoing steps, including keying-off the vehicle, setting the parking brake, activating the hazard lights, etc. It may be desirable to prompt the user to enter a confirmatory input when the vehicle has been prepped (e.g., telematics unit 14 displays a popup window with a selectable softkey indicating VEHICLE PREP COMPLETE). The herein-described tire change modes may help to ensure the vehicle is on a secure gradient for the tire change event while eliminating the need for a hand-cranked or hydraulic jack to change the tire.

With continuing reference to FIG. 3, method 200 proceeds from output block 213 to RIDE HEIGHT subroutine block 215 and commands the vehicle's independent ride height suspension system to modulate the respective ride height position of each corner module to a predefined tire change height. After confirming that the vehicle 10 is parked with the jack stand in place and the wheel lug nuts loosened, CPU 36 of FIG. 1 may transmit command signals to a two-way electric hydraulic pump and a valve array connected to the fluid tank/compressor 136 of FIG. 2 to lower the corresponding (first) ride height of the respective (first) corner module of the subject (first) tire being changed to a predefined lowered height. In so doing, the vehicle chassis is lowered onto the jack stand. At the same time, the CPU 36 transmits command signals to the ride-height suspension system 100 to raise the corresponding (second) ride height (s) of the other (second) corner module(s) to a predefined raised height. In so doing, some or all of the weight of the vehicle is raised off from the corner module and wheel unit of the tire being changed. Automated ride-height adjustability of a corner module 110 may be achieved through controller-governed operation of the ride-height adjustable strut assembly 124 as detailed above in the description of FIG. 2.

To help ensure that the vehicle chassis is fully seated on the jack stand, the predefined lowered height may be a lowest or near lowest ride height position available for the vehicle's corner modules (e.g., fluid bladder 134 is 90-100% empty to minimize uncompressed length of strut assembly 124). Conversely, the predefined raised height may be a highest or near highest ride height position available for the corner modules (e.g., fluid bladder 134 is filled 90-100% to maximize uncompressed length of strut assembly 124). Like the baseline tire pressure and preset maximum secure slope, the predefined lowered and raised heights may be calibrated to the subject vehicle's make/model/trim, etc. It may be desirable to provide the user with an option to override the RIDE HEIGHT subroutine 215 and/or to manually adjust one or more of the raised/lowered ride heights.

After modulating the ride height positions of the corner modules, method 200 executes USER ALERT output block 217 and notifies the user that the tire change mode has been achieved. The telematics unit 14 display device 18 of FIG. 2 may display an alert, such as RIDE HEIGHT SYSTEM SET FOR TIRE CHANGE, which may be accompanied by a user-perceptible visual/audible cue to complete the tire change event. The vehicle controller may be programmed to thereafter determine if the tire change event has been completed, as indicated at TIRE CHANGED decision block 219. As an example, the user may employ one of the telematics unit 14 input controls 32 to select a TIRE CHANGE COMPLETE softkey or to otherwise input notice that the damaged/worn/flat tire has been repaired or replaced. If the tire change is not complete (Block 219=NO), method 200 may run in a continuous loop through blocks 217 and 219 until the smart system controller is able to verify that the tire change event is complete or, if desired, upon expiration of a second loop exit timer. Responsive to a determination that the tire change is complete (Block 219=YES), the method 200 may execute EXIT TIRE CHANGE MODE subroutine block 221 and command the vehicle's adjustable ride height suspension system to raise the ride height of the corner module of the changed tire to a preselected (default or user-designated) height and concurrently lower the ride height(s) of the other corner module(s) to a preselected (default or user-designated) height. Method 200 may thereafter advance to END terminal block 223 and temporarily terminate.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle having a vehicle body and an adjustable ride height suspension system with first and second corner modules movably attaching first and second wheel assemblies, respectively, to the vehicle body, the method comprising:
receiving, via a vehicle controller of the motor vehicle, an input signal indicative of a tire change event for the motor vehicle;
determining, via the vehicle controller, a tire change location of a first tire of the first wheel assembly associated with the tire change event;
determining, via the vehicle controller in response to receiving the input signal, if a real-time vehicle slope of the motor vehicle is less than or equal to a preset maximum secure slope;
prompting, via the vehicle controller in response to determining the real-time vehicle slope is less than or equal to the preset maximum secure slope, a user to prepare the motor vehicle for the tire change event; and
commanding, via the vehicle controller after prompting the user to prepare the motor vehicle, the adjustable ride height suspension system to lower a first ride height of the first corner module to a predefined lowered height and raise a second ride height of the second corner module to a predefined raised height.

2. The method of claim 1, wherein the predefined lowered height is a lowest ride height position available for the first and second corner modules and the predefined raised height is a highest ride height position available for the first and second corner modules.

3. The method of claim 1, wherein the first and second corner module assemblies include controller-adjustable first and second strut assemblies, respectively, wherein lowering the first ride height of the first corner module includes contracting a first uncompressed length of the first strut assembly, and wherein raising the second ride height of the second corner module includes expanding a second uncompressed length of the second strut assembly.

4. The method of claim 1, further comprising determining, via the vehicle controller, the real-time vehicle slope prior to determining if the real-time vehicle slope is less than or equal to the preset maximum secure slope.

5. The method of claim 4, wherein determining the real-time vehicle slope includes receiving, via the vehicle controller from a multi-axis inertial measurement unit (IMU) attached to the vehicle body, sensor data indicative of a transverse-axis pitch angle and/or a longitudinal-axis roll angle of the motor vehicle.

6. The method of claim 4, further comprising prompting, via the vehicle controller in response to determining the real-time vehicle slope is not less than or equal to the preset maximum secure slope, the user to reposition the motor vehicle.

7. The method of claim 5, further comprising:
starting, via the vehicle controller in response to prompting the user to reposition the motor vehicle, a loop exit timer;
determining, via the vehicle controller, if the user repositioned the motor vehicle prior to expiration of the loop exit timer; and
determining, via the vehicle controller in response to determining the user repositioned the motor vehicle prior to expiration of the loop exit timer, if a new real-time vehicle slope of the motor vehicle is less than or equal to the preset maximum secure slope.

8. The method of claim 1, wherein prompting the user to prepare the motor vehicle for the tire change event includes instructing the user to shift the motor vehicle into a park mode, key-off the motor vehicle, place a jack stand adjacent the tire change location of the first tire, and/or loosen a set of lug nuts mounting the first wheel assembly to the first corner module.

9. The method of claim 1, wherein the input signal is a tire change mode activation input received by the vehicle controller from the user via a human machine interface (HMI) device.

10. The method of claim 9, wherein the tire change location is a tire selection input received by the vehicle controller from the user via the HMI.

11. The method of claim 1, wherein the input signal is a low tire pressure signal received by the vehicle controller from a tire-pressure monitoring system (TPMS), and wherein the vehicle controller determines the tire change location using the low tire pressure signal.

12. The method of claim 1, further comprising:
determining, via the vehicle controller, if the tire change event is complete; and
commanding, via the vehicle controller in response to determining the tire change event is complete, the adjustable ride height suspension system to raise the first ride height of the first corner module to a preselected first height and lower the second ride height of the second corner module to a preselected second height.

13. A non-transient, computer-readable medium storing instructions executable by one or more processors of a vehicle controller of a motor vehicle, the motor vehicle including a vehicle body, first and second wheel assemblies, and an adjustable ride height suspension system with first and second corner modules movably attaching the first and second wheel assemblies, respectively, to the vehicle body, the instructions, when executed by the one or more processors, causing the vehicle controller to perform operations comprising:
receiving an input signal indicative of a tire change event for the motor vehicle;
determining a tire change location of a first tire of the first wheel assembly associated with the tire change event;
in response to receiving the input signal, determining if a real-time vehicle slope of the motor vehicle is less than or equal to a preset maximum secure slope;
in response to the real-time vehicle slope being less than or equal to the preset maximum secure slope, prompting a user to prepare the motor vehicle for the tire change event; and
after prompting the user to prepare the motor vehicle, commanding the adjustable ride height suspension system to lower a first ride height of the first corner module to a predefined lowered height and raise a second ride height of the second corner module to a predefined raised height higher than the predefined lowered height.

14. A motor vehicle, comprising:
a vehicle body;
a plurality of road wheels including first and second wheel assemblies;
an adjustable ride height suspension system with first and second corner modules movably attaching the first and second wheel assemblies, respectively, to the vehicle body;
a prime mover attached to the vehicle body and configured to drive one or more of the road wheels to thereby propel the motor vehicle; and
a vehicle controller operatively connected to the adjustable ride height suspension system, the vehicle controller being programmed to:
receive an input signal indicative of a tire change event for the motor vehicle;
determine a tire change location of a first tire of the first wheel assembly associated with the tire change event;
in response to receiving the input signal, determine if a real-time vehicle slope of the motor vehicle is less than or equal to a preset maximum secure slope;
in response to determining the real-time vehicle slope is less than or equal to the preset maximum secure slope, prompt a user to prepare the motor vehicle for the tire change event; and
command the adjustable ride height suspension system to lower a first ride height of the first corner module to a predefined lowered height and raise a second ride height of the second corner module to a predefined raised height higher than the predefined lowered height.

15. The motor vehicle of claim 14, wherein the predefined lowered height is a lowest ride height position available for the first and second corner modules and the predefined raised height is a highest ride height position available for the first and second corner modules.

16. The motor vehicle of claim 14, wherein the vehicle controller is further programmed to determine the real-time vehicle slope prior to determining if the real-time vehicle slope is less than or equal to the preset maximum secure slope.

17. The motor vehicle of claim 16, wherein the vehicle controller is further programmed to prompt the user to reposition the motor vehicle in response to determining the real-time vehicle slope is not less than or equal to the preset maximum secure slope.

18. The motor vehicle of claim 17, wherein the vehicle controller is further programmed to:
start a loop exit timer in response to prompting the user to reposition the motor vehicle;
determine if the user repositioned the motor vehicle prior to expiration of the loop exit timer; and
in response to determining the user repositioned the motor vehicle prior to expiration of the loop exit timer, determine if a new real-time vehicle slope of the motor vehicle is less than or equal to the preset maximum secure slope.

19. The motor vehicle of claim 14, wherein the input signal is a tire change mode activation input received by the vehicle controller from the user via a human machine interface (HMI) device, and wherein the tire change location is a tire selection input received by the vehicle controller from the user via the HMI.

20. The motor vehicle of claim 14, wherein the vehicle controller is further programmed to:
  determine if the tire change event is complete; and
  in response to determining the tire change event is complete, command the adjustable ride height suspension system to raise the first ride height of the first corner module to a preselected first height and lower the second ride height of the second corner module to a preselected second height.

* * * * *